June 3, 1930.    W. C. McCOY    1,761,142
PISTON
Filed Jan. 10, 1929    2 Sheets-Sheet 1

INVENTOR
WILLIAM C. McCOY
BY
Evans & McCoy
ATTORNEY

June 3, 1930.    W. C. McCOY    1,761,142
PISTON
Filed Jan. 10, 1929    2 Sheets-Sheet 2

INVENTOR
WILLIAM C. McCOY
BY
Evans & McCoy
ATTORNEY

Patented June 3, 1930

1,761,142

UNITED STATES PATENT OFFICE

WILLIAM C. McCOY, OF SHAKER HEIGHTS, OHIO, ASSIGNOR TO THE CLEVELAND TRUST COMPANY, OF CLEVELAND, OHIO, A CORPORATION OF OHIO

PISTON

Application filed January 10, 1929. Serial No. 331,513.

This invention relates to pistons for internal combustion engines, and particularly to aluminum alloy pistons.

The principal object of the present invention is to provide an improved type of internal combustion engine piston that is relatively inexpensive to manufacture, light in weight, and is capable of having close fitting contact with the walls of the engine cylinder.

Another object is to provide an aluminum alloy piston having a bearing ring in the head thereof of different material than the material of the piston body wherein the piston body may expand or contract independently of the bearing ring.

Another object is to provide an aluminum alloy piston with a bearing ring in the head thereof of different material than aluminum alloy wherein the piston body may expand or contract independently of the bearing ring, and with a split skirt portion in which one lateral face thereof on the thrust side of the piston has substantially complete engagement with the cylinder wall and only a portion of the skirt on the other working face has engagement with the cylinder wall.

Another object is to provide a close fitting bearing ring in the head of a piston rigidly secured at one side thereof and a split bearing surface at the open end of the piston spaced from the bearing ring on the other side of the piston body to minimize undesirable frictional engagement with the walls of an engine cylinder.

A further object is to provide an aluminum alloy piston having a supplemental bearing ring closely fitting the cylinder wall adjacent to the packing rings and a skirt portion which at the open end thereof closely fits the cylinder wall to substantially prevent movement of the packing rings in the piston head.

A still further object is to provide an aluminum alloy piston having a close fitting supplemental bearing ring adjacent to the packing rings of the piston head, and an integral bearing surface adjacent to the open end of the skirt, the bearing ring being of substantially constant circumferential dimension.

Another object of this invention is to provide a piston of aluminum alloy having a supplemental bearing ring of different material than aluminum alloy, the bearing ring being rigidly secured to the piston body substantially flush with the explosion thrust face of the piston.

Still another object is to provide a piston of aluminum alloy having a supplemental bearing ring of different material than aluminum alloy rigidly secured to the piston body substantially flush with the explosion thrust face of the piston and having an integral circumferential bearing surface adjacent to the open end of the skirt and flush with the explosion thrust face of the piston but extending beyond the remainder of the skirt.

These being among the objects of the present invention, the same consists of certain features of construction and combinations of parts to be hereinafter described with reference to the accompanying drawings and then claimed, having the above and other objects in view.

In the drawings, which illustrate a preferred embodiment of this invention:

Figure 1:
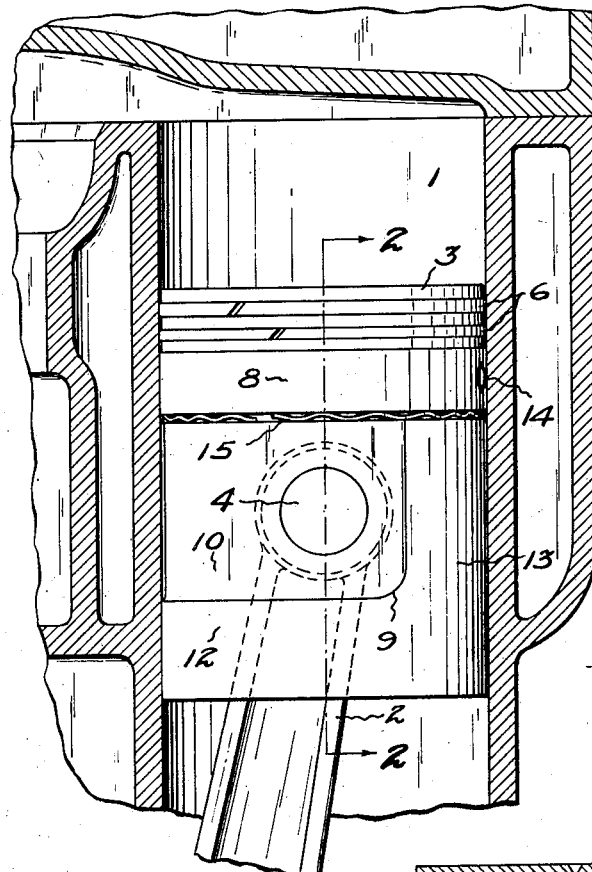
Figure 1 is a sectional view taken longitudinally through an engine cylinder showing a piston therein.

It has been proposed heretofore to construct pistons for internal combustion engines of aluminum alloy wherein the expansion of the piston body was controlled by members having a different rate of thermal expansion than aluminum alloy, but such members have been cast integrally with or permanently secured to the body of the piston. In many of these structures the piston body was substantially incompressible circumferentially; in others the piston skirt was split longitudinally.

A piston has also been proposed in which the piston body is thermally expansible and contractible independently of suitably split bearing rings and having supplemental spring rings between the bearing rings and the piston body. The present invention contemplates a simplified form of piston having the operating advantages of these general types of pistons and being of less expensive construction.

The present invention proposes a piston body of aluminum alloy having a relatively narrow circumferential bearing surface adjacent to its open end, a bearing surface extending substantially throughout its lateral explosion thrust face, and a bearing ring of relatively negligible thermally expansible material in the piston head which is rigidly secured to the piston body at the explosion thrust face. The bearing ring fits closely with the cylinder walls to permit independent contraction and expansion of the piston body, to thereby substantially prevent undesirable cylinder wall friction and scuffing of the piston body against the cylinder wall. The cylinder wall is also worn smooth by the material of the bearing ring in applicant's construction, which is preferably sufficiently hard to polish the cylinder wall and prevent rapid wear of the piston body, now commonly caused by irregularities or roughness in the cylinder wall, without sacrificing the bearing qualities of the aluminum alloy piston, thus insuring a close fitting piston of greatly prolonged life. The bearing ring, together with the circumferential bearing surface adjacent to the open end of the piston and the lateral bearing surface on the explosion thrust face of the piston, prevents piston slap and also prevents seizing of the piston body with the cylinder walls during the expansion of the aluminum alloy when the engine is run for a considerable length of time.

Referring to the accompanying drawings, in which like numerals refer to like parts throughout the several views, the piston shown is slidably positioned in a water jacketed engine cylinder 1 and is connected to an engine crank shaft (not shown) by a conventional connecting rod 2, the rod 2 being pivoted to the piston body 3 by a wrist-pin 4 carried by the piston bosses 5. The piston comprises the piston body 3, of suitable aluminum alloy, a plurality of conventional packing rings 6 mounted in grooves 7 in the piston head, and an endless bearing ring 8 that is mounted in a suitable circumferential groove 11 formed adjacent to the packing ring grooves 7 above the wrist-pin bosses 5.

The piston body is relieved over the upper portion of one lateral face and well beyond each of the wrist-pin bosses 5, the contour of the relief thus described being defined by the line 9 that extends around the edge of the relief. The relief of the area 10 defined by the line 9 is either cast or machined into the piston body a sufficient degree to permit the relieved portion of the piston body to thermally expand within the cylinder without exerting excessive pressure against the cylinder wall under the most severe operating conditions.

Figure 4:
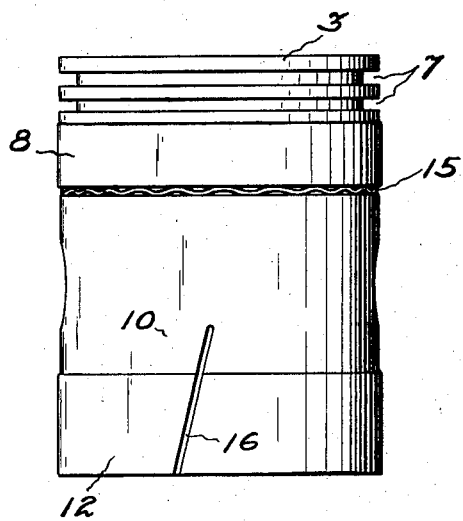
Fig. 4 is an elevational view showing the split skirt and lower bearing surface of the piston skirt.
Figure 5:
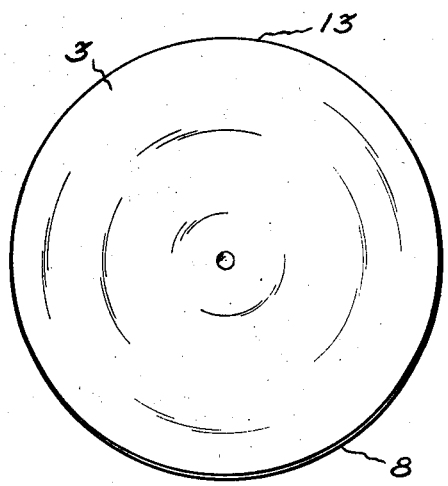
Fig. 5 is a plan view of the top of the piston showing the relative positions of the bearing ring and piston body.
Figure 7:
Fig. 7 is an elevational view of the spring ring.

By relieving the piston body 3 as just described a circumferential bearing surface 12 is provided adjacent to the open end of the skirt portion, which surface 12 is substantially of the same curvature as, and continuous with, the unrelieved portion 13 of the piston body on the explosion thrust face thereof. Sufficient outward spring pressure of the bearing surface 12 is obtained by slitting the skirt longitudinally from the open end thereof to a point well within the relieved area. The slit 16 is preferably formed opposite the explosion thrust face, as indicated in Fig. 4.

Figure 2:
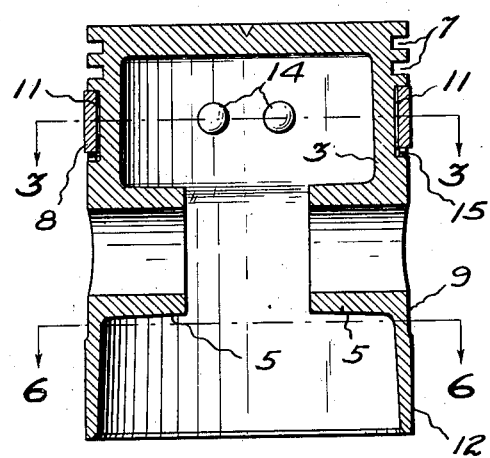
Fig. 2 is a sectional view taken through the axis of the wrist pin substantially on the line 2—2 of Fig. 1.

The ring 11 is secured to the explosion thrust side of the piston body substantially flush with the lateral bearing face 13 by means of rivets 14. The rivets 14 are countersunk in the bearing ring 8 and extend through the piston wall, as shown in Fig. 2. The lower edge of the bearing ring 8 is preferably spaced from the lower face of the groove 11, and a wave ring 15 is positioned in the space provided thereby. The wave ring 15 is formed of relatively stiff spring steel, so called Swedish steel, or other suitable material, and extends substantially around the entire circumference of the piston in this embodiment of the invention. The two ends of the wave ring 15, however, do not abut because of the necessity of accommodating the thermal contraction of the piston body. The wave ring 15 possesses sufficient spring characteristics to bear against the ring 8 and hold the same against the upper face of the groove 11 during the compression stroke of the piston to prevent the same from moving in a slight arc about the rivets 14, in order to eliminate scoring or cutting of the cylinder walls by the sharp lower edge of the bearing ring 8.

The bearing ring 8 may in some instances be formed of cast iron of a character suitable for piston rings, or it may be formed of steel alloy having a relatively low or negligible coefficient of thermal expansion. The ring 8 normally has sufficient mechanical clearance in the engine cylinder 1 to accommodate the oil film between the cylinder wall and the piston. By making the bearing ring 8 of a material having a somewhat lesser coefficient of thermal expansion than the cylinder wall a bearing ring is obtained that will substantially maintain a constant clearance within the cylinder 1. A ring material of lesser coefficient of thermal expansion than the cylinder material is desired because of the high temperature at which the ring normally operates, as compared with the cylinder wall.

Figure 3:
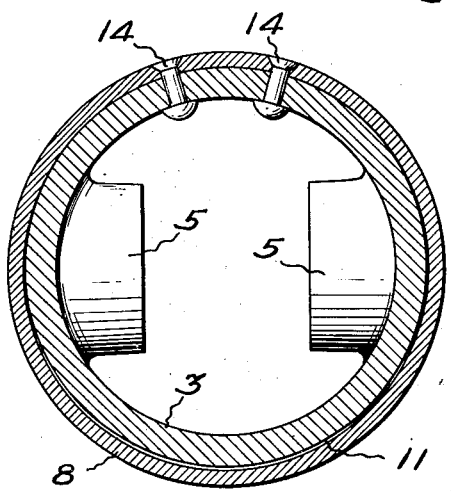
Fig. 3 is a transverse sectional view taken substantially on line 3—3 of Fig. 2 showing the mounting for the bearing ring.

The piston is preferably formed in a permanent mold and the aluminum alloy comprising the body of the same is cast around the endless bearing ring 8, which is securely held within the mold cavity concentric with the inner walls of the piston to be cast. The aluminum alloy, when it cools after being cast, shrinks radially in all directions and therefore draws away from the inner circumference of the bearing ring 8, thereby forming the bottom of the ring groove 11, which is spaced equally from all points of the inner wall of the ring 8 which is held in the permanent mold. The piston body also shrinks radially, leaving the ring 8 projecting beyond the outer face of the piston body but remaining coaxial therewith. The piston body also shrinks longitudinally, firmly clamping the ring in this position. The relieved area 10 may, and preferably is, provided during the casting of the piston body. As soon as the piston is sufficiently cooled the bearing ring 8 is ground to the correct size and the piston body is likewise machined to the correct size. Other machining operations, such as reaming the wrist-pin bosses 5 and machining the packing ring grooves 7, may also be performed at this time. The split 16 may then be sawed or formed in any suitable manner in the skirt of the piston. During the machining operations a suitable cutting tool is used to cut a circumferential recess adjacent to the lower edge of the bearing ring 8. In other words, the ring groove 11 is widened by cutting away the metal of the piston body adjacent to the lower edge of the bearing ring 8 to a depth preferably the same as that of the ring groove 11. This frees the ring 8 from its clamped position in the piston body, to provide a groove that is wider than the bearing ring 8. The split wave ring 15 previously described is then positioned in place by inserting the same between the lower end face of the ring 8 and the lower side wall of the groove 11. The resiliency of the wave ring 15 forces the bearing ring 8 firmly against the upper side wall of the groove 11. The bearing ring 8 is then shifted transversely of the piston body, so that its inner face seats against the bottom of the groove 11 on the explosion thrust side of the piston body and the ring is secured to the piston body in this position by the rivets 14. As shown in Fig. 3, the bearing ring 8 is eccentrically positioned relative to the bottom of the groove 11. When the bearing ring and outer surfaces of the piston are machined to correct size it is preferable that the distance between their lateral faces on the thrust side of the piston be substantially equal to the clearance space, caused by shrinkage of the piston body during casting, between the bottom of the ring groove 11 and the inner wall of the ring 8, so that, when the ring 8 is shifted to its eccentric position as just described, the outer face on the explosion thrust side of the same will be substantially flush with the lateral bearing surface 13 of the piston body. It is to be noted that the lateral bearing surface 13 has substantially the same radius as the ring 8, and also that the lower bearing surface 12 has substantially the same radius as the ring 8 and is substantially coaxial therewith when the piston is in place in the engine cylinder.

Figure 8:
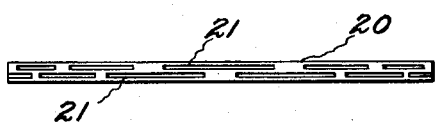
Fig. 8 is an elevational view of a modified form of spring ring.
Figure 6:
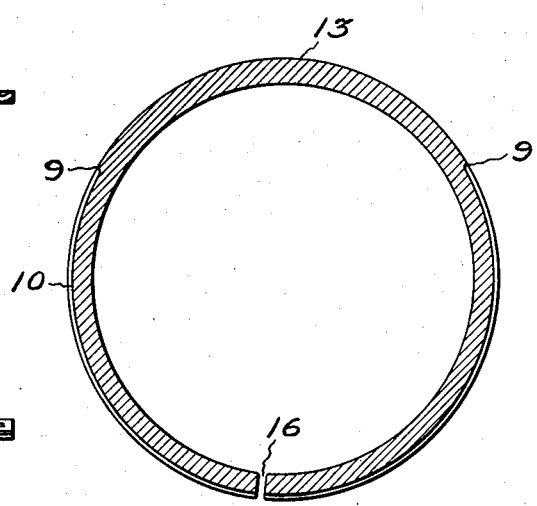
Fig. 6 is a transverse section taken substantially on line 6—6 of Fig. 2, showing the explosion thrust face of the piston body.

In Fig. 8 an alternative form of spring ring is shown, which comprises a split ring 20 having a plurality of overlapping slots 21 which render the same sufficiently resilient to hold the bearing ring 8 in its correct axial position and to still permit longitudinal contraction and expansion of the piston body wthout affecting the position of the bearing ring.

In operation, a piston of the character described will bear on the bearing surface 13, and also preferably on the bearing ring 8 during the explosion or working stroke of the same. The other side of the piston, which is forced in the direction of the cylinder walls solely by the component of side thrust from the compression in the explosive chamber, bears on the bearing ring 8 and the unrelieved bearing surface 12 of the lower end of the piston skirt. It will, therefore, be seen that a very small clearance may be maintained in the zone of the packing rings of the piston, which prevents objectionable movement of the packing rings in the piston head, since the unrelieved bottom of the piston closely fits the cylinder wall and the top of the piston and also has a bearing ring in the head thereof, which closely fits the cylinder wall. The bearing ring 8 is so close a fit to the cylinder that it will serve in part as a packing ring, although it is endless and its size is not controlled by pressure engagement with the cylinder wall. Hence it is obvious that a minimum number of packing rings may be used. It is also evident that the piston body may expand independently of the bearing ring from its explosion thrust face without seizing with the cylinder wall because of the relieved area 10, which is free to expand as it will, and because of the split 16 in the lower portion of the piston skirt.

It can be seen that a piston is thus provided which has spaced bearing contacts with the cylinder wall on the one side of the piston body and full engagement with the cylinder wall on the explosion thrust side of the piston body to absorb the brunt of the explosion shock. It is evident that piston slap and wear of the cylinder wall will be reduced to a minimum.

Although I have described one application of the principles of this invention, it is to be understood that slight changes may be made without departing from the spirit and substance of the broad invention, the scope of which is commensurate with the appended claims.

What I claim is:

1. A piston for an engine cylinder, comprising a relatively highly expansive body portion, a bearing ring in the head thereof having a relatively low coefficient of thermal expansion and rigidly secured at one side to said body portion to hold the same against bodily movement relative to said body portion and closely fitting the wall of said cylinder, whereby said body portion may expand and contract independently of said ring.

2. A piston for an engine cylinder, comprising a relatively highly expansive body portion, a bearing ring groove in the head thereof, a bearing ring having a relatively low coefficient of thermal expansion within said groove rigidly secured at one side to said body portion and closely fitting the wall of said cylinder, thereby permitting expansion and contraction of said body portion independently of said bearing ring.

3. A piston for an engine cylinder, comprising a relatively highly expansive body portion, a bearing ring groove in the head thereof, a bearing ring having a relatively low coefficient of thermal expansion eccentrically positioned within and rigidly secured at one side of the piston to the bottom of said groove to hold the same against bodily movement relative to said piston body portion, said ring having relatively small mechanical clearance with the cylinder wall, whereby said body portion may expand and contract independently of said bearing ring.

4. A piston for an engine cylinder, comprising a relatively highly expansive body portion, a bearing ring groove of substantially uniform depth in the head thereof, a bearing ring of relatively low expansible material eccentrically positioned within and rigidly secured at one side to the bottom of said groove and closely fitting the wall of said cylinder, and a resilient member positioned between an end face of said ring and a side wall of said groove, whereby said body portion may expand and contract independently of said bearing ring.

5. A piston for an engine cylinder, comprising a relatively highly expansive body portion, a bearing ring groove in the head thereof, a bearing ring positioned within said groove and rigidly secured to the bottom thereof at the explosion thrust face of said piston with its outer face substantially flush with said explosion thrust face, said bearing ring being of lesser width than the width of said groove, and a resilient member interposed between a side wall of said groove and an end face of said ring.

6. A piston for an engine cylinder, comprising a relatively highly expansive body portion, a bearing ring groove in the head thereof, an endless bearing ring positioned in said groove and rigidly secured to said piston body on one side of said body, and a bearing surface adjacent to the open end of said body portion well spaced from said bearing ring on the side of said body portion opposite the side to which said bearing ring is secured.

7. A piston for an engine cylinder, comprising a relatively highly expansive body portion, a bearing ring groove in the head thereof, an endless bearing ring positioned in said groove and secured to the bottom thereof at the explosion thrust side of said piston, and a resilient bearing ring mounted between a side wall of said groove and an end face of said ring, the working thrust face of said body portion being of subtsantially the same radius as said bearing ring, said body portion being relieved from a point adjacent to one wrist-pin boss around the other piston working face and past the other boss in the zone of the bearing ring to a point below the boss, to provide a bearing surface adjacent to the open end of said body portion, having substantially the same diameter as and coaxial with said bearing ring, said bearing surface being longitudinally split substantially opposite said explosion thrust face.

8. A piston for an engine cylinder, comprising a relatively highly expansive body portion having a relieved area on one side adjacent to the open end of the skirt and adjacent to and including points surrounding the wrist-pin bosses, the unrelieved area providing a lower bearing surface adjacent to the open end of said skirt and a lateral explosion thrust surface continuous with said bearing surface, said skirt being split from its open end to the zone of the wrist-pin bosses, a bearing ring groove in the head of said body portion, and a bearing ring having a relatively low coefficient of thermal expansion capable of closely fitting the wall of said cylinder, positioned in said groove and rigidly secured to the bottom thereof with its outer face on one side substantially flush with said lateral explosion thrust face of said piston body portion.

9. A piston for an engine cylinder, comprising a relatively highly expansive body portion having a relieved area on one side adjacent to the open end of the skirt and adjacent to and including points surrounding the wrist-pin bosses, the unrelieved area providing a lower bearing surface adjacent to the open end of said skirt and a lateral explosion thrust surface continuous with said bearing surface, said skirt being split from its open end to the zone of the wrist-pin bosses, a bearing ring groove in the head of said body portion, a bearing ring having a relatively low coefficient of thermal expansion positioned in said groove coaxial with said lower bearing surface and secured to the bottom of said groove at the explosion thrust side of said piston substantially flush with said lateral explosion thrust surface, said ring being of substantially the same radius as said lower bearing surface when said piston is positioned in said cylinder, and a relative stiff spring ring positioned in said groove between a wall thereof and an end face of said bearing ring to prevent distortion of said ring during movement of said piston in said cylinder.

10. In a piston for an engine cylinder, a continuous bearing ring having a relatively low coefficient of thermal expansion in the head of said piston rigidly secured at one side of said piston capable of closely fitting the walls of said cylinder, the body of said piston being cast around said bearing ring, the metal of said body adjacent to a transverse face of said ring being circumferentially cut away to provide a space between said transverse face of the bearing ring and the adjacent wall of the groove containing said ring, and a relatively stiff spring ring positioned in said space to resiliently force said ring against the upper side wall of said groove to hold said ring against distortion during movement of said piston in said cylinder.

In testimony whereof I affix my signature.

WILLIAM C. McCOY.